UNITED STATES PATENT OFFICE.

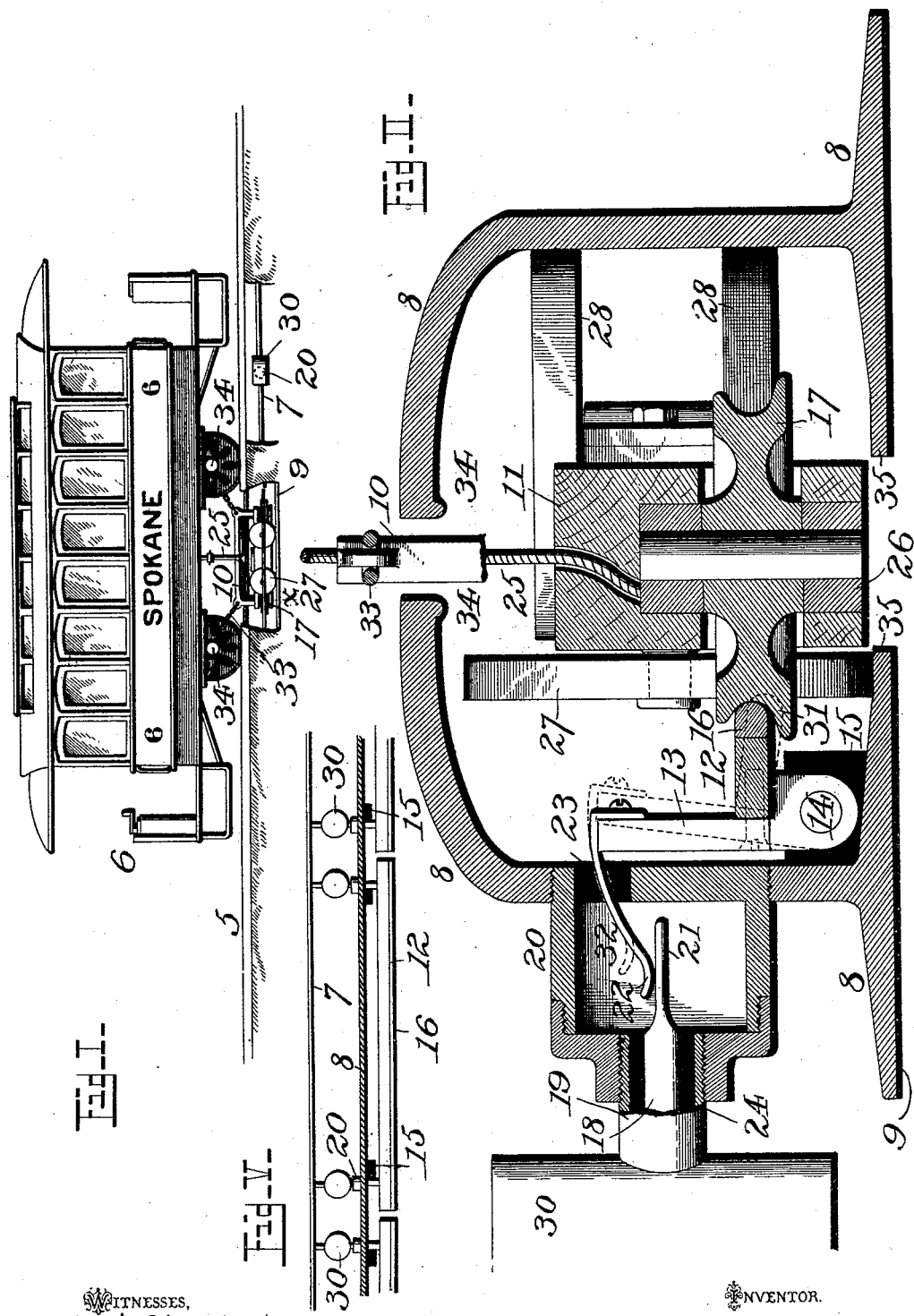

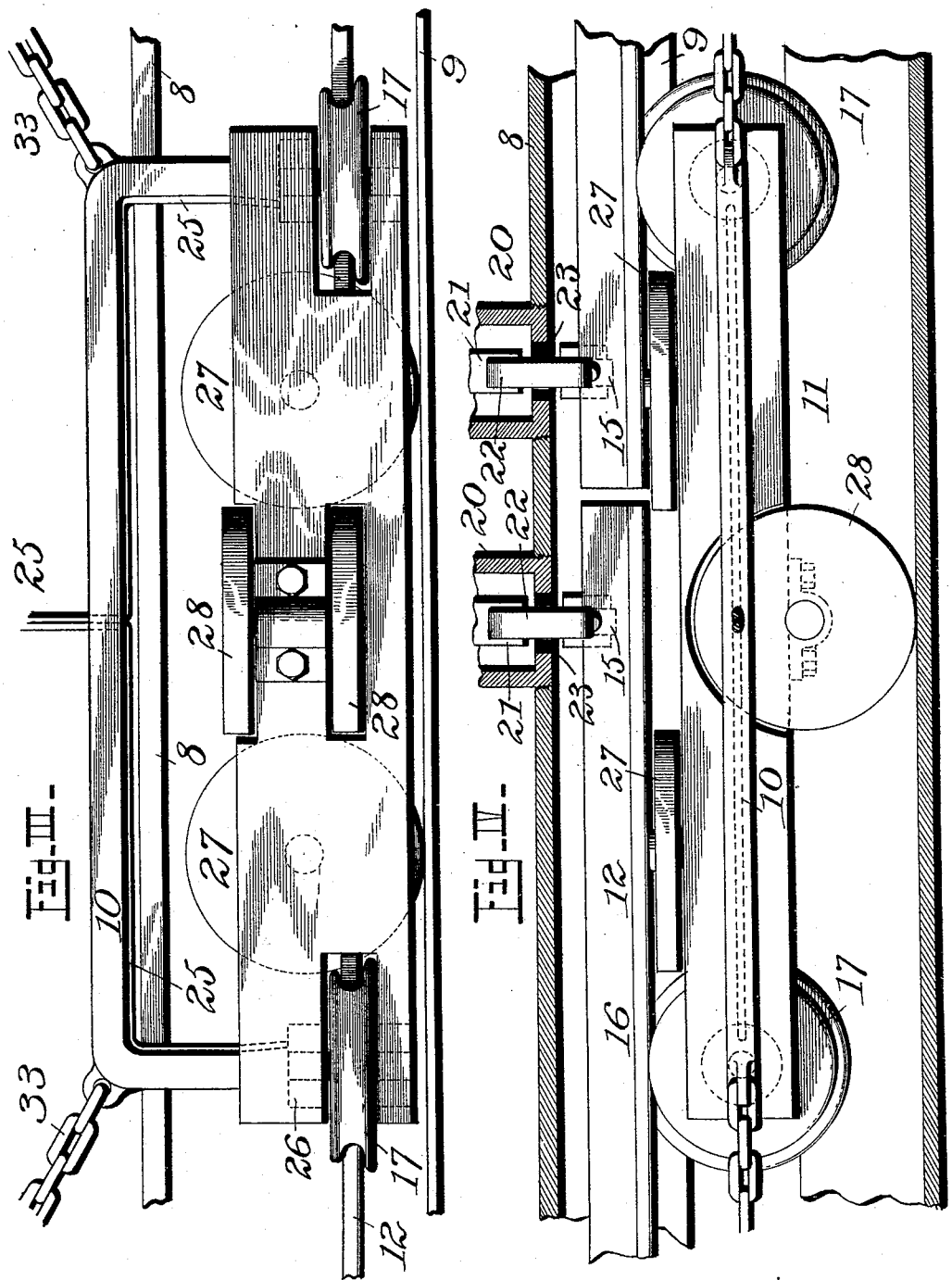

CHARLES P. TATRO, OF SPOKANE, WASHINGTON, ASSIGNOR, BY DIRECT AND MESNE ASSIGNMENTS, OF FIFTY-ONE ONE-HUNDREDTHS TO HIMSELF, SAMUEL F. COONS, AND CHARLES M. PATTERSON, OF SAME PLACE.

UNDERGROUND CONDUIT FOR ELECTRIC RAILWAYS.

SPECIFICATION forming part of Letters Patent No. 489,422, dated January 3, 1893.

Application filed March 28, 1892. Serial No. 426,638. (No model.)

*To all whom it may concern:*

Be it known that I, CHARLES P. TATRO, a citizen of the United States, residing at Spokane, in the county of Spokane and State of Washington, have invented certain new and useful Improvements in Underground Conduits for Electric Railways; and I do hereby declare the following to be a full, clear, and exact description of the invention, such as will enable others skilled in the art to which it appertains to make and use the same.

This invention relates in general to underground conduits for electric railways of that class in which a series of insulated rails, each separated from the next, are located within the conduit to communicate electricity from a line wire which lies along beside the conduit, through a trolley traveling upon the said rail to a motor upon the car which carries the trolley. And it relates more particularly to means of communication between the rail and the line wire; means for reducing a current of high voltage from the line wire to a much lower voltage in the rail so as to prevent a loss of electricity from the rail in wet weather; and means for mounting the trolley carriage upon wheels in the conduit and connecting it with the car so that the car may pass around curves, or be subjected to the usual rocking motion in travel without breaking, or in any way affecting the electric communication between the motor upon the car and the line wire under ground.

To this end my invention consists in the construction and combination of parts forming an underground conduit for electric railways, hereinafter described and claimed, reference being had to the accompanying drawings, in which—

Figure I, represents a portion of an electric railway with a car thereon in side elevation, a portion of the road-bed being broken away to show my trolley, which is here represented very large in proportion to the size of the car. Fig. II, is a transverse vertical section of my conduit at the line *x* of Fig. I, on a large scale. Fig. III, represents the trolley carriage in side elevation, and shows a portion of the conduit. Fig. IV, is a plan or top view of the trolley carriage showing a portion of the conduit in horizontal section. Fig. V, is a theoretic representation of the electric system involved in this invention.

5 represents the road-bed, 6 a car adapted to travel thereon by means of the usual track and wheels which have no electric connection with the line wire 7, unless it be for discharging or returning to the prime motor the electric energy which has passed through the car motor.

8 represents the body of the conduit consisting of two portions which are to be rolled into form like long rails and be fastened at their bases 9 upon the usual cross ties which are located under ground for the tracks to rest on, so that the side portions 8 will be flush with the top of the ground. These two side portions are made exactly alike, one of them being turned end-for-end to match the other when the two lie side-by-side, forming between them the tunnel of the conduit. The side portions 8 will be fixed upon the cross ties with their upper adjacent edges about three-fourths or seven-eighths of an inch apart to form the slot through which the bail 10 of the trolley carriage 11 projects in traveling to and fro in service.

12 represents communicating rails formed in sections of any desired length, and each section is supported upon lever arms 13, which are pivoted at 14 to blocks of insulating material 15 that are secured to the inside of the conduit. Each section of this rail will be supported at each end and as often as may be required midway upon the pivoted levers 13. I prefer to make the rail of steel with a face 16 of copper to obtain perfect electric communication with the wheels 17, which are journaled in the trolley and adapted to travel upon the rail.

18 represents a branch of the line wire 7, projecting from end of the branch pipe 19 into a switch box 20. The projecting end 21 of the branch 18 is flattened to give a large surface contact with the switch 22. This switch consists of a spring secured to the arm 13 to move therewith through an arc of motion of three-fourths of an inch, more or less while the rail moves about one-fourth of an inch, the body of the spring passing through a piece of insulating material 23, which is fixed in the side of the conduit.

24 represents insulating material between the branch 18 and the branch pipe 19.

25 is a wire communicating between the box or bearing 26 of wheel 17, and the motor (not shown) on the car. The wire 25 is covered with insulating material and is buried in a groove in the under side of the bail 10, whereby it is entirely protected from wearing contact with anyting in service.

27 represents a pair of wheels running vertically upon the base 35 of the conduit and journaled upon the trolley carriage to support the latter bodily.

There are two of the wheels 17 one forward of the other about eighteen inches between centers, and each wheel is provided with a communicating wire 25, and both wheels travel upon the same rail 12. There are also two of the wheels 27 located in line with each other upon the trolley to travel in the same path upon the base of the conduit, and this path is upon the same side of the conduit which supports the rail so that the wheels 17 are maintained at the right height to engage the rail.

28 represents a pair of wheels mounted upon one and the same shaft to travel against the vertical side of the conduit. The lower wheel 28 is of the same height as the two wheels 17 and is located midway between them longitudinally of the trolley carriage, whereby the effect of a tripod is obtained to insure contact of the two wheels 17 with the rail 12. The upper wheel 28 is opposed to the two wheels 27 to prevent the rear side of the trolley carriage from tipping backward or downward.

30 represents electric converters, one of which is located upon each branch of the line wire 7 between the line wire and the switch box 20. I claim nothing novel in this converter itself, for it may be of any one of those already known, or any one that may be invented for the purpose of converting a high voltage of the line wire into a low voltage at the switch, whereby the potential of the switch and of the rail 12 connected by the switch to the branch may be so reduced that there may be little or no escape of electricity from the exposed surface in wet weather, and yet whereby, through well known electric principles a true metallic contact with the rail, such a contact as is made by the wheels 17, will communicate the whole electricity of the main line wire to the car motor. In the absence of a trolley the rail 12 swings down by gravity, with the arms 13 upon the pivots 14 to the position shown in dotted lines 31, which brings the arm 13 away from the side of the conduit and breaks connection between the switch 22 and the live branch wire or opens the switch, as shown in dotted lines 32.

The operation is as follows: When the forward one of the wheels 17 of the trolley carriage meets the end of the depressed rail 12 it crowds the rail backward and upward, thereby moving the lever arm 13 to carry the switch 22 into contact with the line wire 21. This establishes a circuit through the wheel 17 and the wire 25 with the motor on the car whereby the car is propelled, and there are two wheels 17, both adapted to make electric connection in order that when the forward wheel is passing over the break between the two rails 12 the rear wheel 17 will still be in circuit, and for the further purpose of offering double means for completing the circuit so that danger by losing control of the car may be avoided on steep grades, and passing around curves. The trolley carriage is freely connected with the car by means of chains 33 connecting the two ends of the bail 10 with the car wheel axles 34. The two ends of the bail 10 being very narrow, not more than an inch and half wide along the slot, avoid bearing against the sides of the slot on the curves, as, the bail would bear if its whole length extended along in the slot. This is a matter of great importance not only in preventing wear which would eventually reach the conducting wires 25, but it avoids all liability of the bail becoming wedged in the slot. By reversing the action of the motor upon the car the engineer may reverse the direction of travel of the car. There are no parts in this conduit requiring to be reversed to enable the car to travel as well one way as the other. The advantage of locating a converter upon each branch of the main line wire whereby the potential of the exposed parts 12 and 13 is so greatly reduced below the normal potential of the line wire that electricity will not be lost in service even in wet weather, is a point of great importance in the economy of operating electric railways.

34 represents a rib projecting downward along the inner edges of the sides 8 of the conduit to serve as eaves from which surface water may drop rather than to run down the sides, and the sides have inward projecting base flanges 35, one of which serves as a track upon which the wheels 27 travel, and the two flanges 35 are separated to leave a slot all the way, through the bottom of the tunnel to permit water, snow, stones and other obstacles which could enter the top slot, to fall through out of the path of the trolley. If any accident should occur to block the trolley so that it could not be immediately released, the chains 33 may be unhooked therefrom and the conducting wire 25 may be uncoupled so as to permit the car to be pulled to its destination by other power than its own motor, leaving the trolley to be attended to by repairers.

Having thus fully described my invention, what I believe to be new and desire to secure by Letters Patent, is the following

1. The combination in a conduit for an electric railway of two similarly shaped side portions of the conduit body, one being turned end-for-end and the two located side-by-side at a distance apart to leave a slot at the top and one at the bottom; the base of the sides being flanged like an inverted T, and a trolley carriage provided with wheels to run upon one flange at its inner edge and upon the vertical wall of the side opposite, substantially as described.

2. The combination in a conduit for an electric railway, of a body forming an open slotted tunnel; a series of rails pivotally mounted within the tunnel and provided with vertical arms; a line wire located beside the tunnel and provided with branches, and switches in arched form attached to the said rail arms and fitted to slide through the side of the tunnel or conduit body to form electric connection between the said rails and line wire branches, substantially as described.

3. The combination in a conduit for an electric railway, of a conduit body consisting of two similar side portions having base flanges one of which may serve as a rail, and the two side portions separated to form an open slot between them; a rail located in the conduit and adapted for electric connection with a line wire, and a trolley fitted to travel in the conduit and having two wheels to engage the said rail and one wheel in the same plane and opposite to them midway to engage the back of the conduit, and having two other wheels journaled to travel vertically on the bottom of the conduit on the side thereof to which the said rail is attached, and further having another wheel midway of the trolley and above the first named midway wheel, to travel on the back of the conduit, and a free connection between the trolley and a car, substantially as described.

4. The combination in a conduit for an electric railway, of a trolley carriage body; two wheels thereon in a horizontal plane and adapted to engage a rail; two other wheels thereon in a vertical plane and on the same side of the body as the first two wheels; and two horizontal wheels located one above the other midway and on the opposite side of the body to the four wheels mentioned and means for freely connecting the trolley carriage both electrically and mechanically, with a car, substantially as described.

5. The combination in a conduit for an electric railway, of a trolley body mounted upon two vertical wheels in line of each other at one side of the body; means for electric communication between the trolley and a live rail; a horizontal wheel on the trolley body near its top and opposite to and midway between the said vertical wheels, substantially as described.

In testimony whereof I affix my signature in presence of two witnesses.

CHARLES P. TATRO.

Witnesses:
WM. H. DE LACY,
W. X. STEVENS.